United States Patent [19]

Hensley et al.

[11] E Patent Number: Re. 32,505

[45] Reissued Date of Patent: Sep. 15, 1987

[54] COMBUSTION INITIATION SYSTEM

[76] Inventors: George H. Hensley, Star Route, Box 150L, Alameda, N. Mex. 87114; Raymond E. Hensley, 3805 Garcia Northeast, Albuquerque, N. Mex. 87111

[21] Appl. No.: 616,509

[22] Filed: Jun. 1, 1984

Related U.S. Patent Documents

Reissue of:

[64] Patent No.: 4,333,125
Issued: Jun. 1, 1982
Appl. No.: 119,869
Filed: Feb. 8, 1980

[51] Int. Cl.[4] ..... F23Q 3/00

[52] U.S. Cl. ..... 361/257; 313/138; 313/141; 313/143

[58] Field of Search ..... 361/253, 257; 313/118, 313/138, 141, 143; 123/169 R, 169 EL, 654

[56] References Cited

U.S. PATENT DOCUMENTS

| | | | |
|---|---|---|---|
| 1,452,177 | 4/1923 | Aragose | 313/138 |
| 1,499,594 | 7/1924 | Riley | 313/138 |
| 2,113,516 | 4/1938 | Possenti | 313/118 |
| 2,194,695 | 3/1940 | Devine | 313/138 |
| 2,416,107 | 2/1947 | Litton | 313/143 |
| 2,436,973 | 3/1948 | Pereles | 313/138 |
| 2,483,357 | 9/1949 | Winholm | 313/138 |
| 3,324,347 | 6/1967 | Brugnola | 313/143 |
| 3,842,818 | 10/1974 | Cowell et al. | 123/169 R |
| 3,842,819 | 10/1974 | Atkins et al. | 123/169 R |
| 3,974,412 | 8/1976 | Pratt, Jr. | 123/169 EL |
| 4,020,388 | 4/1977 | Pratt, Jr. | 313/141 |
| 4,087,719 | 5/1978 | Pratt, Jr. | 313/141 |
| 4,109,633 | 8/1978 | Mitsudo et al. | 313/118 |
| 4,122,816 | 10/1978 | Fitzgerald et al. | 173/169 EL |
| 4,161,937 | 7/1979 | Gerry | 123/169 EL |

FOREIGN PATENT DOCUMENTS

| | | | |
|---|---|---|---|
| 2400623 | 10/1975 | Fed. Rep. of Germany | 123/169 R |
| 2739413 | 8/1979 | Fed. Rep. of Germany | 123/169 EL |
| 8102328 | 8/1981 | PCT Int'l Appl. | 361/257 |

*Primary Examiner*—L. T. Hix
*Assistant Examiner*—David M. Gray
*Attorney, Agent, or Firm*—Cullen, Sloman, Cantor, Grauer, Scott & Rutherford

[57] ABSTRACT

A combustion initiation system includes an initiating device for producing, containing and propelling a combustion initiating plasma having an energy density approaching that produced by combustion of the fuel itself, and is suitable for initiating combustion in relatively lean mixtures of various types of fuels. A high voltage power supply delivers electrical energy by a coaxial cable to the initiating device which communicates with a fuel mixture in a combustion area such as the combustion chamber of an ordinary internal combustion engine. The initiating device includes a capacitive portion for storing a large quantity of electrical energy therein derived from the power supply, and an electrode portion integral with the capacitive portion which comprises a pair of concentric, rod shaped electrodes for producing a high energy, umbrella shaped plasma discharge, using the inverse pinch technique. Due to the close proximity between the capacitive and electrode portions of the initiating device, rapid energy transfer from the former to the latter creates high magnetic pressures which transform the discharge into a high energy plasma jet which is delivered well into the combustion area.

63 Claims, 12 Drawing Figures

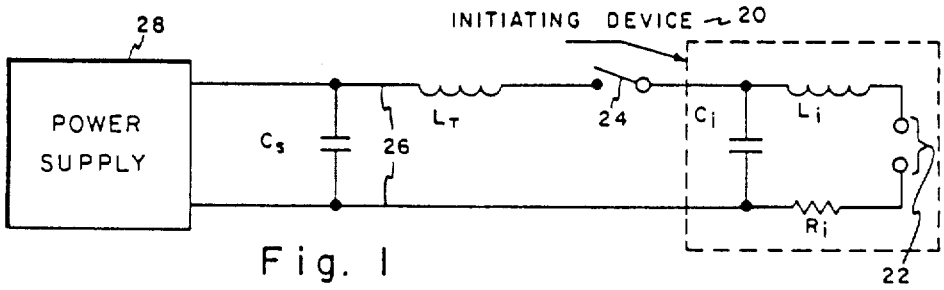
Fig. 1
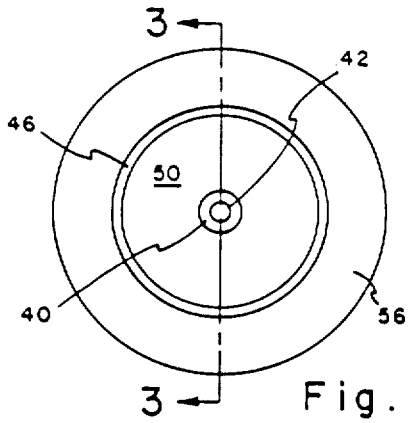
Fig. 2
Fig. 3
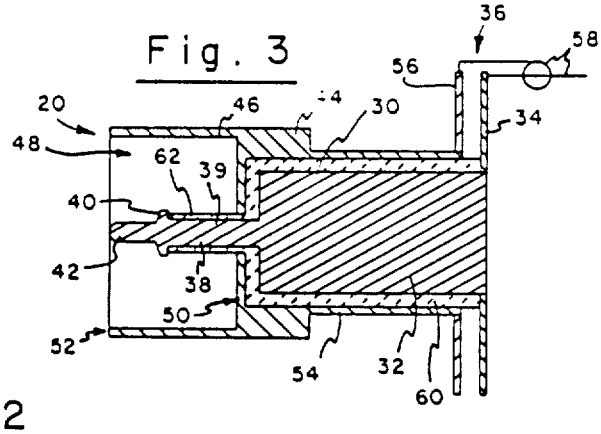
Fig. 4
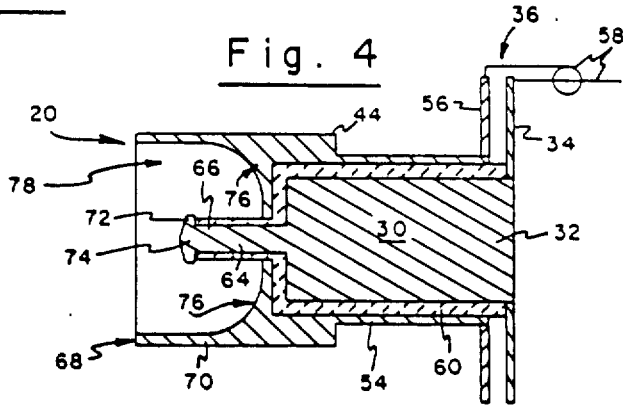
Fig. 5
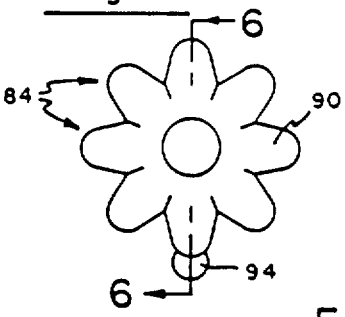
Fig. 6
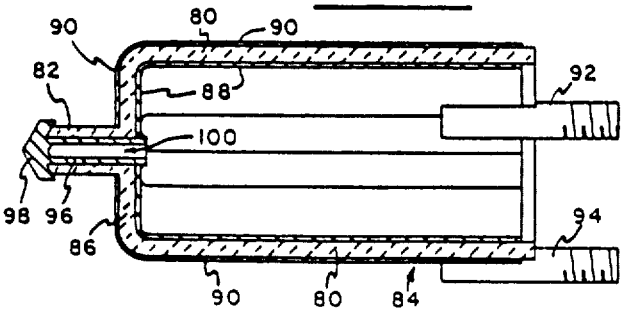
Fig. 7
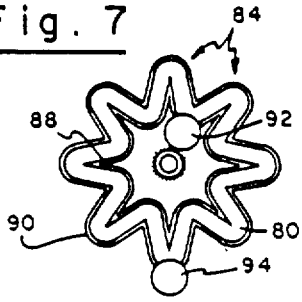

COMBUSTION INITIATION SYSTEM

Matter enclosed in heavy brackets [ ] appears in the original patent but forms no part of this reissue specification; matter printed in italics indicates the additions made by reissue.

TECHNICAL FIELD

This invention generally deals with combustion of fuels, especially in internal combustion engines, and relates more particularly to a device implemented method of improving combustion using high energy plasma initiation techniques.

BACKGROUND ART

Conventional internal combustion engines, such as those used in motor vehicles, have long employed spark producing systems for initiating combustion of fuels within combustion cylinder chambers. Although "spark plug" type devices for initiating fuel combustion have gained almost universal use in the past, it has been known that these devices were not particularly efficient in maximizing fuel combustion, hence, additional fuel was required to achieve a desired level of power output; moreover, incomplete fuel combustion resulted in the production of air pollutants which had to be dealt with. In order to assure satisfactory operation, prior art spark plug devices have required that the spark discharge produced thereby communicate with a region within the combustion chamber where an optimum (stoichiometric) fuel-to-air mixture exists, since the resulting energy density of combustion from a stoichiometric region within the chamber is usually high enough to ensure that the remainder of the fuel achieves combustion. Inasmuch as the energy produced by the spark discharge is insufficient to induce combustion of fuel-to-air mixtures which are not stoichiometric, richer mixtures of fuel to air were required in the past in order to assure that the spark discharge reached a stoichiometric region within the combustion chamber. However, due to the limited volume within the chamber which might be reached by a spark discharge, stoichiometric values of fuel to air mixtures could not always be provided under cold starting, idling, or part load operating conditions.

Because of the problems discussed above related to the relatively low energy produced by spark discharge systems, numerous attempts have been made in the past to increase the energy delivered by the spark discharge, and various prior art spark plug improvements are alleged to yield a "hotter spark", but none of such prior art spark plug devices are in fact capable of delivering the level of power needed to produce relatively complete combustion of fuel to air mixtures which are less than stoichiometric.

Ignition devices for producing an ignition plasma, such as that disclosed in U.S. Pat. No. 3,842,818, have been devised in an effort to increase the level of energy delivered to the fuel to air mixture, but the energy levels achieved by these plasma producing devices have not been sufficient to initiate combustion in fuel-to-air mixtures which are relatively far from stoichiometric, and therefore achieved satisfactory results only when a stoichiometric region of such fuel-to-air mixture was in proximity to the ignition plasma.

Another prior art attempt at solving the problem involves providing a combustion chamber physically configured to produce stratification of the fuel-to-air therewithin, whereby the richer mixtures are produced mixtures in a region immediately adjacent a conventional spark discharge initiating device, thereby assuring that the initiating spark reaches a region of fuel-to-air mixture which is close to stoichiometric.

SUMMARY OF THE INVENTION

The present invention provides a combustion initiation system which includes an initiating device that produces an initiation plasma with an energy density comparable to that produced by combustion of the fuel in the chamber, in order to initiate combustion in fuel-to-air mixtures which are relatively far from stoichiometric, thereby allowing the use of leaner fuel-to-air mixtures for improving operating economy while also reducing hydrocarbon emissions. The initiation system also includes a high voltage pulsed power supply for delivering electrical energy by means of a coaxial cable to the initiating device which communicates with the combustion chamber. The initiating device includes a capacitive portion for storing alarge quantity of electrical energy therein derived from the pulsed power supply and an electrode portion coupled to the capacitive portion which comprises a pair of concentric electrodes for producing a high energy plasma discharge, using the inverse pinch technique. The discharge is transformed by high magnetic pressures into [a] *an outwardly propelled, inverse* linear pinch discharge forming a high energy plasma jet that is linearly delivered well into the combustion chamber. Exceptionally high levels of power inherent in the plasma jet are achieved in part by the close proximity between the electrode portion and capacitive portion which allows rapid transfer of the stored energy to the former from the latter.

BRIEF DESCRIPTION OF THE DRAWINGS

In the drawings, which form an integral part of the specification and are to be read in conjunction therewith, and in which like numerals are employed to represent like parts in the various views;

FIG. 1 is a simplified block and schematic diagram of a combustion initiation system which forms the present invention;

FIG. 2 is an end view of one form of a combustion initiating device used in conjunction with the initiation system shown in FIG. 1;

FIG. 3 is a longitudinal sectional view taken along line 3—3 in FIG. 2;

FIG. 4 is a longitudinal sectional view of another form of combustion initiating device suitable for use in conjunction with the initiation system shown in FIG. 1;

FIG. 5 is a view of one end of a combustion initiating device suitable for use in conjunction with the initiation system shown in FIG. 1;

FIG. 6 is a longitudinal sectional view of the device depicted in FIG. 5;

FIG. 7 is a view of the other end of the device depicted in FIG. 5;

DETAILED DESCRIPTION OF THE INVENTION

Figure 10:
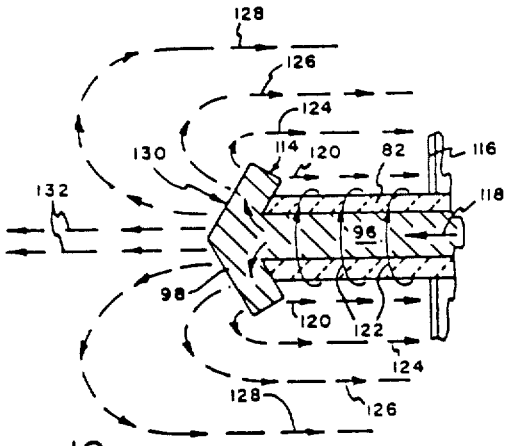
FIG. 10 is a longitudinal sectional view of the tip portion of the initiation device shown in FIGS. 5-7, wherein arrows and broken lines depict the relationship between current flow, magnetic fields and plasma generated during discharge of the initiation device.

The present invention is concerned with improving fuel combustion efficiency by increasing the energy density of the medium which is used to initiate the combustion of the fuel; this is achieved by producing a plasma which has an energy density nearly approaching or exceeding the energy density produced by combustion of the fuel itself, yet requires an electrical energy input for production thereof of only a few percent of the energy resulting from the combustion of the fuel.

Obviously, there are limitations on the amount of energy which may be expended in bringing about combustion of the fuel. Because of the relative inefficiency of internal combustion engines, however, some additional energy may be devoted to initiating combustion if sufficient gains in combustion efficiency are realized. For example, assume the maximum amount of energy which can be used to create initiation is given by $E_i$ and the required energy for initiating the leanest fuel mixture is given by:

$$(1)\ E_i/V_i$$

where $V_i$ is the volume of the initiating discharge. In order to maximize the value of $E_i/V_i$, it becomes necessary to minimize $V_i$ since $E_i$ cannot be increased beyond a predetermined value. The present invention comprises, in part, recognition of the fact that $V_i$ may be minimized by minimizing the time required for the delivery of the energy $E_i$ from an energy source to the initiation discharge. In order to minimize the delivery time of the energy $E_i$, a unique energy delivery system is provided in which an initiation capacitor $C_i$ is disposed adjacent the combustion fuel and is coupled by a transmission line to a storage capacitor $C_s$. For purposes of a simple theoretical explanation of the invention reference is now made to FIG. 1 wherein the electrical characteristics of an initiating device constructed in accordance with the present invention are generally indicated within the broken line 20. The initiating device 20 includes a capacitive portion $C_i$, an inductive portion $L_i$, a resistive portion $R_i$, and a spark gap indicated between the terminals 22 which is in series with the inductive portion $L_i$ and resistive portion $R_i$ but is in parallel with the capacitive portion $C_i$.

The initiating device 20 is coupled through a switch 24 and transmission lines 26 having an inherent inductance $L_t$ to power supply 28 whose construction will be discussed later in more detail. Assuming now that the initiating device 20 is disposed in an area adjacent a fuel whose combustion is to initiated, such as gasoline within the combustion chamber of an internal combustion engine, the switch 25 is switched to the open position thereby causing the power supply 28 to charge capacitor $C_s$ to the desired voltage which will be somewhat greater in magnitude than the voltage needed to initiate discharge of the device 20. Switch 24 is then closed which causes the charge on capacitor $C_s$ to be transferred to capacitor $C_i$ thereby charging the latter until the breakdown voltage of device 20 is reached at which time capacitor $C_i$ discharges to produce a high energy plasma jet which initiates combustion of the adjacent fuel. It can be appreciated that the sole possible control over the timing of the discharge of device 20 rests in the timing of the closure of switch 24, consequently, the time necessary for the breakdown of device 20 and initiation of the plasma jet, plus the time need for the completion of fuel combustion by the plasma jet must be short in comparison to the time required for substantial changes to take place in the combustion chamber. By making the capacitor $C_i$ an integral part of the initiating device 20, the time required to [charge] *discharge* the device 20 to the breakdown level whereby to produce a plasma jet is minimized.

Since the capacitor $C_i$ is made an integral part of the device 20, it is necessary to minimize the physical space volume occupied by such capacitor. By charging capacitor $C_i$ to the necessary voltage level within a relatively short time period, typically on the order of a few microseconds, insulating materials may be used in the construction of capacitor $C_i$ which have a relatively high dielectric constant, such as water. The determination of the discharge time of the device 20 predetermines the maximum values for inductance $L_t$ and capacitor $C_s$.

Typically, the capacitor $C_i$ is charged in approximately 10 microseconds or less, and preferably in about 1.5 microseconds, which in turn dictates a value for $L_t$ that can best be met by employing a coaxial transmission cable, and a coaxial construction for the initiating device 20.

The total power produced by the initiating device 20 is given by the following formula:

$$\text{Power} = R_i I^2 + L_i \dot{I} + L\ \dot{i} I I$$

where I is the current and the dot notation is a time derivative. The $R_i I^2$ component represents ohmic heating which is normally achieved in prior art type devices. However, the last two components $L_i \dot{I}$ and $L_i \dot{I} I$ respectively represent additional power resulting from the plasma produced and the magnetic power being stored in the circuit; none of the known prior art devices produces substantial power from these last two mentioned components. The maximum current delivered by the device 20 is given by the equation:

$$I = V\sqrt{\frac{C_i}{L_i}}$$

where V represents the voltage at which energy is stored in capacitor $C_i$. Since the magnetic pressure P at a radius r from the center of the inner conductor of the initiating device 20 is given by:

$$[P = \frac{\mu I^2}{8\pi^2 r^2}] \qquad P = \frac{\mu I^2}{8\pi^2 r^2}.$$

*the current discharged between the electrodes is given by:*

$$I = \sqrt{\frac{8P\pi^2 r^2}{\mu}}$$

and the energy stored in the capacitor $C_i$ is given by:

$$E = \tfrac{1}{2}C_i V^2$$

it follows that the maximum magnetic pressure P max is:

$$P_{max} = \frac{E}{4\pi^2 r^2 L_i}.$$

consequently, it is imperative to minimize $L_i$ in order to maximize the magnetic pressure P. In order to make $L_i$ small, the capacitor $C_i$ is located integral with the initiating device and the inner electrode comprises a relatively large diameter outside the plasma chamber. While the overall inductance $L_i$ must be small. [The magnetic density] *That portion of the inductance* finally associated with the plasma itself must be as large as possible and for this reason the radius of the inner conductor of the initiating device 20 is made small within the plasma chamber.

Referring now to FIG. 3, an initiating device, previously generally designated in FIG. 1 by the numeral 20, includes a high voltage electrode 30 and comprises a unitary member manufactured from a suitable electrically conductive material as by machining. Electrode 30 includes a cylindrically shaped rear portion 32 electrically connected to the high voltage plate 34 of a transient storage capacitor generally designated at 36, and a forward portion 38 which includes a cylindrical rod shaped member or shank 39 having a diameter substantially less than that of the rear portion 32. The forward portion 38 of the device 20 is provided with an annular flange 40 having a diameter marginally greater than that of the shank 30 and terminates in an elongate tip 42 symmetrically rounded at the outer extremity thereof. The diameter of the tip 42 may be slightly less in magnitude than the diameter of the shank 39.

The initiating device 20 further includes a second electrode 44 of unitary construction comprising an electrically conductive material suitably formed into a cylindrically shaped forward section 46 circumscribing the forward portion 38 of the electrode 30 which includes a ring shaped cavity 48 in the outer end thereof defining an annular face 50 extending perpendicular to the base of the forward portion 38 and axially concentric with respect to the latter. Essentially the entire forward portion 38 of electrode 30 is disposed within the cavity 48 and extends longitudinally outward to a point transversely aligned with the outer rim edge 52 of the forward section 46. The rear section 54 of the second electrode 44 is also cylindrically shaped but possesses a diameter less than that of the forward section 46 and circumscribes a major part of the rear portion 32 of the electrode 30. The base of the rear section 54 is suitably electrically connected to the ground plate 56 of the storage capacitor 36. Plates 34 and 56 are coupled with a suitable source of electrical energy (which will be discussed later in more detail) by a coaxial cable schematically indicated by the nuneral 58.

Electrodes 30 and 44 are insulated from each other by a layer of insulation 60 comprising any of various dielectrics such as water, oil, glycerene, or suitable solid material. The insulation 60 will include a relatively thin sleeve 62 thereof circumscribing the shank 39 and extending between the flange 40 and face 50, it should be noted here that although the plates 34 and 56 are shown herein as circular in shape, any geometry thereof may be employed and in fact, as will become later apparent, may be folded in order to minimize the space displaced thereby. In any event, it is important that the plates forming the capacitor portion of the device be located as close as possible to the above-mentioned forward portions of the device forming the firing tip in order to minimize the inductance in the resulting discharge circuit.

Another form of the initiating device 20 shown in FIG. 4 is similar in construction to the embodiment shown in FIGS. 2 and 3 but is distinguishable therefrom in several respects. First, the forward portion 64 of the high voltage electrode 30 is provided with a shank 66 whose outer free extremity is spaced longitudinally inward from the plane formed by the outer peripheral edge or rim 68 of the forward section 70 of the second or ground electrode 44. The shank 66 includes an annular flange 72 similar to the flange 40, which terminates in a conically shaped tip 74. The forward section 70 of the second electrode 44 includes a dish shaped face 76 partially defining one end of the combustion cavity 78 and circumscribing the forward portion 64 of the high voltage electrode. The initiating devices shown in FIGS. 3 and 4 are essentially identical in all other respects.

Attention is now directed to FIGS. 5–7 wherein still another form of the initiating device is depicted. The device in FIGS. 5–7 comprises a unitary, elongate body of insulating dielectric, such as cast ceramic, having a main portion 80 and a sleeve portion 82 formed integral with the main portion 80 on one end of the latter. Main portion 80 is defined by a plurality of radial folds forming longitudinally extending fins 84 having a star shaped cross-section as best seen in FIG. 7. One end of the main portion 80 opposite the sleeve portion 82 is essentially open, as is the interior are a therewithin, while the opposite the sleeve portion 82. A suitable electrically conductive end thereof is enclosed by a shoulder 86 circumscribing inner covering 90, applied as by metallization, covers essentially the entire inner surface of the main body portion 80, while a similar outer covering 92 is applied to the exterior surface of the fins 84 and shoulder 86. It may be necessary for ease of manufacturing to also apply metallization to the exterior surface areas of the sleeve portion 82 which may be later removed as by machining. Inner and outer coverings 88 and 90 respectively, are electrically insulated from each other by the dielectric comprising main body portion 80, and in effect, form capacitor plates similar to plates 34 and 56 discussed with reference to the device shown in FIGS. 3 and 4.

A pair of cylindrical lugs 92 and 94 are respectively joined as by brazing to the inner and outer coverings 88 and 90 adjacent the open end of the main body portion 80, and provide corresponding high voltage and ground terminals for the device. The high voltage portion of the device further includes a cylindrically shaped shank 96 formed from electrically conductive material surrounded by the sleeve portion 82, one end of the shank 96 being joined, as by brazing, to the inner electrical covering 88, the opposite end thereof terminating in a pointed, circularly shaped tip 98. The shank 96 may be provided with a bore 100 extending longitudinally therethrough from the end thereof adjacent the open interior areas of the main body portion 80 to a point adjacent the tip 98. The bore 100 will accommodate expansion of the shank 96 during the brazing thereof to the inner coating 88. It is to be noted here that other suitable dielectric, insulative materials may be used in place of ceramic for body and sleeve portions 80 and 82, such as water, isopropyl alcohol, or oil in which case a casing generally conforming to the body and sleeve portions 80 and 82 may be provided for containing such liquids therein.

Figure 8:
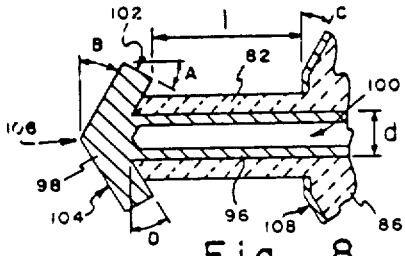
FIG. 8 is a detailed, longitudinal sectional view, taken on a larger scale, of the tip portion of the device depicted in FIGS. 5–7 which is also suitable for use in connection with the devices shown in FIGS. 2–4.
Figure 9:
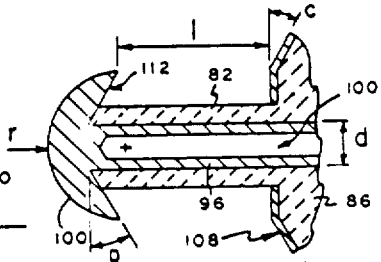
FIG. 9 is a detailed, longitudinal sectional view of an alternate tip portion design suitable for use in connection with any of the devices depicted in FIGS. 2–7.

FIGS. 8 and 9 depict detailed views of two preferred forms of tips and the currently known optimum geometrical design parameters therefor. In the case of the conically shaped pointed tip shown in FIG. 8, such tip includes a thickness of material presenting a flat face 102 forming an angle A with respect to the longitudinal axis of the shank 96 which may be between 0 and 45 degrees. The forward face 104 of the tip is inclined rearwardly from a central apex 106 and may form an angle B with respect to an axis extending normal to the longitudinal axis of shank 96 which optimally is within the range of 15 to 90 degrees. The length "l" will be determined by the previously discussed angles and the requirements of the particular application of the initiating device. In some cases, it may be desirable to form the exterior of the shoulder 86 (and conforming outer covering 90) in an annular bevel 108, the interior edge of which is radially spaced from the circumference of the sleeve portion 82. The exterior face of the bevel 108 will preferably form an angle C with respect to a normal from the longitudinal axis of the shank 96 which is approximately equal to angle "D". The tip shown in FIG. 9 is similar to that shown in FIG. 8 but is provided with a rounded forward face 110 having a radius r, the rear face 112 of which is inclined forwardly and forms an angle D with respect to an axis normal to the longitudinal axis of the shank 96 which is preferably in the range of 0 to 45 degrees.

Attention is now directed to FIG. 10 in which the formation of plasma at the tip of the initiating device is depicted during discharge thereof. Although a tip configuration is depicted similar to that shown in FIGS. 6 and 8, it is to be understood that the description below also applies to the other tip configurations disclosed herein and equivalents thereof.

The initial step in creating a discharge of the initiating device involves steadily and rapidly charging the capacitive portion of the device (e.g. plates 34 and 56 in FIGS. 3 and 4) using a later discussed high voltage pulsed power supply. As previously indicated, charging of the capacitive portion will be performed within approximately 10 microseconds, and preferably in about 1.5 microseconds. When such capacitive portion is charged to a sufficiently high voltage, electrical breakdown occurs between an outer edge 114 of the tip 98 and the ground electrode 116. Preferably, the capacitive portion will be charged to a potential of between 30 to 100 kilovolts. In the case of a device of the type depicted in FIGS. 3 and 4, initial breakdown may comprise a "streamer" of electrical discharge current occurring between the annular flanges 40 and 72, and the interior surface areas of the side walls of the corresponding forward sections 46 and 70. However, as the current indicated by the arrow 118 flowing through the shank 96 to the tip rapidly increases, the breakdown current flow immediately shifts to a path between the outer edge 114 of the area of the ground electrode 116 circumscribing the shank 96 and generally parallel to the latter. This shift in breakdown current flow is a result of the fact that the impedance between the high voltage and ground portion of the device is at a minimum value along a line between the outer edge 114 and the ground electrode 116 due to the back EMF produced around the shank 96 by the current 118 flowing therethrough.

The resulting breakdown current flow [is] *may be* in the form of a cylindrically shaped [sheet] *sheath* indicated by the arrows 120 which completely circumscribes the shank 96 and is insulated from the latter by the sleeve portion 82; simultaneously, the flow of current 118 in the shank 96 produces a cylindircal ring-shaped [electromagnetic] *magnetic* field around the shank 96, the direction of *the* corresponding magnetic flux lines being indicated at 122, in accordance with the well known right hand rule. The resulting electromagnetic field 122 functions to exert [an axially inward] *a radially outward*pressure on the [sheet] *sheath of* current flow 120 thereby tending to [confine] *move* the latter *outwardly* to produce the well known linear *inverse* pinch effect. As the current flow 118 increases, the discharge [sheet] *sheath* current flow 120 likewise increases which [tends to force current flow 120 radially outwardly away from the shank 96, however, the electromagnetic field 124 continues to confine the radial expansion of the current flow 120] *causes increased joule heating in the discharge plasma* thereby increasing the *thermal* pressure and energy density of the current flow 120. As the *current flow 118 through shank 96 and the* discharge current flow 120 [continues] *continue* to increase still further in magnitude, *the increasing inverse pinch magnetic pressure due to the circumferential magnetic field 122 around shank 96 and the increasing thermal pressure of plasma discharge 120 combine to urge discharge 120* [a second electromagnetic field (not shown) similar to that indicated by flux lines 122, but opposite in circumferential direction thereto, is created by the current flow 120 which urges the latter] radially outward away from the shank 96. The discharge [sheet] current flow 120 continues to increase in energy density and radially expands to the successive positions indicated by the arrows 124, 126 and 128 until the diameter of the cylindrical discharge sheet exceeds that of the tip 98 to allow the point that the current emanates from the tip 98 to shift from the outer edges 114 thereof to the forward face 130 thereof, whereby the emanating discharge current forms an annular "umbrella" discharge shape. When the discharge [sheet of] current 120 expands past the edges 114 of the tip 98, the discharge is free to shift axially forward, toward the left in FIG. 10, and eventually assumes a path indicated by the arrows 132 longitudinally aligned with the shaft 96, whereby the discharge is delivered forwardly to a fuel to be ignited in an area, such as a combustion chamber, toward the left as shown in FIG. 10.

The high energy current [sheet] *sheath* discharge, of course, ionizes the atmosphere surrounding the shank 96 and tip 98 to produce a high energy plasma thereat. As a result of the [confining] forces applied to the discharge by the resultant electromagnetic field and rapid pressure and energy build-up, the plasma is delivered to the fuel in a slingshot or jet-like action. Because of the rapid delivery of energy to the tip 98 and geometrical configuration of the electrodes, the power of the plasma jet delivered to the fuel to ignite the latter may exceed the power to used to charge the capacitive portion of the device by [an order to fifty times or more.] *many orders of magnitude.*

Depending on the particular geometry of the tip and the electrical potential to which the capacitive portion of the device is charged, the device is advantageously discharged within approximately 1.2 to about 60 nanoseconds, and preferably within 1.2 to about 2 nanoseconds. The rate of discharge will affect the energy density and geometry of the resulting plasma jet; the shorter discharge times producing a jet of high energy density and narrow, linear geometry while longer discharge times result in a jet of somewhat lower energy density having dispersed geometry. The [relative] rapid [discharge] *combustion* rate of the combustion initiating device of the present invention is due in part to the fact that the tip 98 is longitudinally spaced from, and is circumscribed by, the ground electrode 116, thereby defining a relatively large volume of space which is ionized by the high voltage between the electrodes. Thus, a large volume of space becomes electrically [superconductive] *conductive* (due to ionization) just prior to discharge.

[As is apparent from the foregoing description, electromagnetic fields function to confine the plasma discharge during formation thereof and it] *It* is not necessary to provide side walls circumscribing the tip portion of the device as shown in the embodiments of FIGS. 3 and 4 in many applications. The walls surrounding the tip do serve to desirably reduce the overall resistance of the discharge circuit, however, the need to employ such sidewalls to achieve optimum results will be governed by numerous design considerations involved in a specific application.

Figure 12:
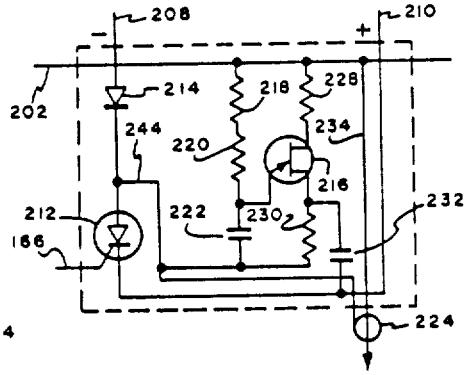
FIG. 12 is a detailed schematic diagram of the currently preferred form of one of the electronic distribution systems shown in FIG. 11.
Figure 11:
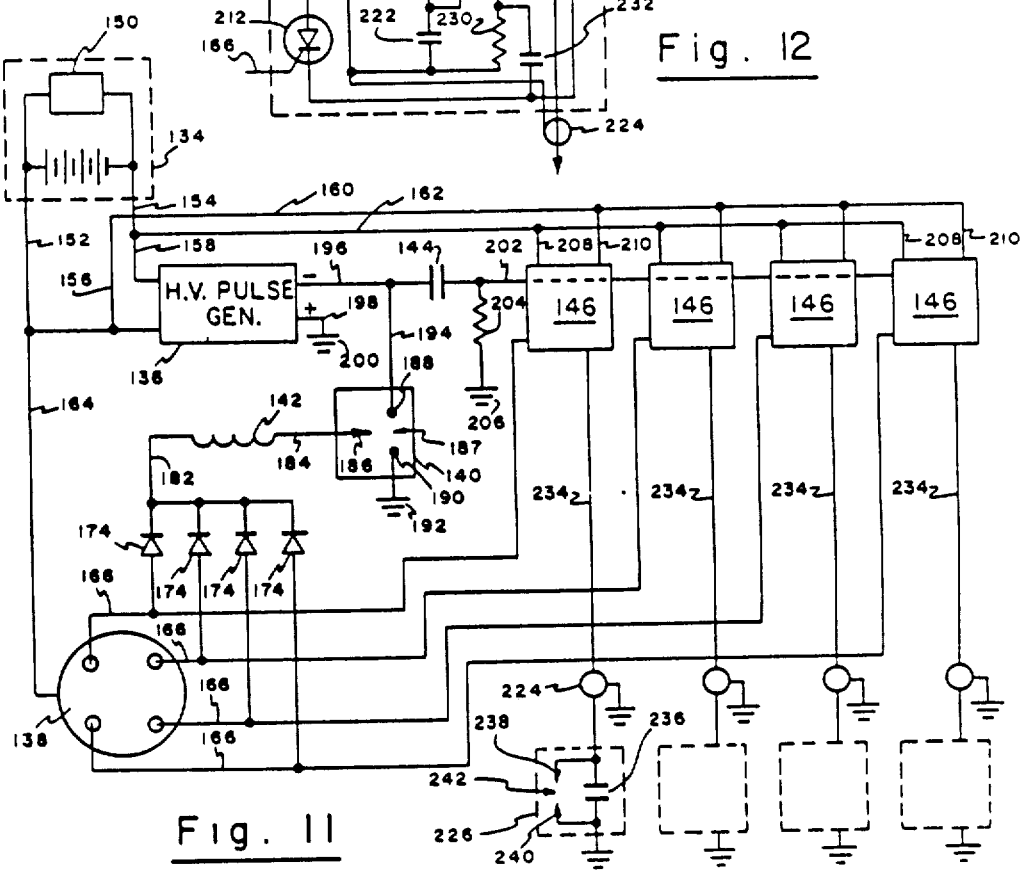
FIG. 11 is a combined block, diagrammatic and schematic view of a initiation system, in accordance with the present invention, particularly adapted for use in connection with an internal combustion engine, such as that used on conventional automobiles.

Attention is now directed to FIGS. 11 and 12, wherein an initiation system is depicted employing the initiating device forming a part of the present invention, which is particularly suited for use with a conventional internal combustion engine, such as that used in automobiles.

As disclosed in FIG. 11, the initiating system is particularly adapted for use with a four cylinder engine, however, as will become apparent later, the invention is equally suitable for use with an engine having any number of combustion chambers. Broadly, the initiating system comprises a primary power source indicated within the broken line 134, a high voltage pulse generator 136, an essentially conventional electrical distributor diagrammatically represented by the numeral 138, a spark gap device 140, a standard ignition coil 142, a high energy storage capacitor 144, and a plurality of electronic distribution circuits, each indicated in block form by the numeral 146 in FIG. 11, and shown in more detail in FIG. 12.

Power source 134 comprises an ordinary 12 or 24 volt storage battery 148 coupled in parallel relationship with a conventional charging device 150, such as an alternator mechanically driven by the automobile's engine, and is further coupled with a pair of output lines 152 and 154. The high voltage pulse generator 136 derives power from the power source 134 via branch lines 156 and 158 which are respectively connected to output lines 152 and 154. Each of the inputs of distribution circuits 146 are likewise coupled across the output lines 152 and 154 and in parallel relationship to the high voltage pulse generator 136 by distribution lines 160 and 162. The input of distributor 138 is coupled to the power source 143 by line 164. Distributor 138 is conventional in design and includes an output terminal corresponding to each of the four engine cylinders, which are operably coupled to corresponding output lines 166 which lines are respectively coupled to the trigger inputs of respectively corresponding ones of electronic distribution circuits 146. Each of the output lines 166 is also respectively coupled through corresponding diodes 174 to line 182 which forms the input of ignition coil 142. Ignition coil 142 may comprise a coil of conventional design ordinarily employed in automobile engine electrical systems, or may be alternately comprise a shunt type inductor, since such coil merely functions in the present application as a means of controlling the timing of the delivery of electronic pulses, rather than to initiate firing as in conventional designs. The output of coil 142 is coupled by line 184 to the trigger terminal 186 of the spark gap device 140.

Spark gap device 140 comprises an enclosed, pressure tight housing of a suitable geometric configuration, such as a cylinder, and is filled with a suitable gas, such as air which is pressurized above the atmospheric pressure level. Spark gap device 140 further includes first and second spaced apart electrodes 188 and 190 respectively forming an air gap therebetween located proximal to the trigger terminal 186. Terminal 190 is coupled to ground 192, while terminal 188 is coupled via line 194 to the negative output line 196 of the high voltage pulse generator 136, the positive output line 198 of the latter mentioned generator being connected to ground 200.

High voltage pulse generator 136 may comprise a conventional design of the SCR power converter type having a constant SCR trigger voltage of approximately 15,000 to 50,000 volts, and will be designed to charge the high voltage storage capacitor 144 to approximately 30 to 40 KV at a repetition rate of approximately 10 pulses per second. High energy storage capacitor 144 may be of a ceramic construction and will preferably have a rating of approximately 100 KV to assure long life and reliability. One plate of the storage capacitor 144 is coupled with the combination of the pulse generator 136 and spark gap device 140 while the other plate of capacitor 144 is coupled in series with each of the electronic distribution circuits 146 by line 202. One side of a resistor 204 is coupled with line 202 between capacitor 144 and circuits 146, while the other side of resistor 202 is coupled to ground 206.

Each of the electronic distribution circuits 146 has a pair of input lines 208 and 210 respectively coupled to the distribution lines 162 and 160 thereby placing each of the circuits 146 in parallel relationship with each other. The distribution circuits 146 each essentially comprise a variable time, power one-shot multivibrator of a conventional design such as that shown in IEEE, volume 12:7, pages 25 and 26.

Referring momentarily now to FIG. 12 in particular, the distribution circuit 6 includes an SCR 212 (silicon controlled rectifier) having its anode coupled through a diode 214 to line 208 while its gate is coupled to line 166. One main terminal of a TRIAC 216 is coupled through resistors 218, 220 and capacitor 222 between line 202 and line 224 which forms the ground portion 224 of a circuit connecting each of the initiating devices (schematically indicated within the broken lines 226 in FIG. 11). The other main terminal and the gate of TRIAC 216 are respectively coupled through resistors 228 and 230 to line 202 and the ground portions 224. The input line 210 is coupled to the cathode of SCR 212, while a capacitor 232 is connected between input line 210 and the gate of TRIAC 216. A high voltage delivery line 234 is connected to line 202 and forms the high voltage portion of a coaxial cable coupling the distribution circuit 146 with the corresponding initiating devices 226 which communicates with the corresponding engine cylinders.

As shown in FIG. 11, each of the initiating devices 226 comprises a capacitive portion indicated by the capacitor 236, a high voltage electrode 238, a ground electrode 240 and a spark gap between electrodes 238 and 240 indicated at 242.

Turning now to a description of the operation of the initiation system, power is delivered from the power source 134 to the distributor 138 as well as to the pulse generator 136, via output lines 152 and 154. The high voltage pulse generator has a direct current output of approximately 5 milliamps and charges the storage capacitor 144 to approximately 50 KV. Voltage in line 164 is selectively coupled to the output lines 166 of the distributor 138 in a predetermined, timed sequence in the ordinary manner. As the automobile's engine mechanically rotates a rotor within the distributor 138, lines 166 are sequentially coupled with line 164, and the resulting firing signal is delivered through line 182 to the ignition coil 142 which functions in the present invention to impose a time delay on the delivery of such signal to the trigger terminal 186; the values of the various components will be selected in a manner such that the capacitor 144 is charged to the desired level prior to the delivery of a firing signal to the terminal 186.

Assuming now that the capacitor 144 is fully charged and one of the initiating devices 226 is about to be fired, a control signal delivered to trigger terminal 186 induces breakdown of the spark gap 187 within the spark gap device 140, thereby producing a firing spark between terminals 188 and 190 which couples the capacitor 144 to the ground 192. At this point, the capacitor 144 discharges into line 202 with a resulting current flow being delivered to each of the distribution circuits 146 and the corresponding high voltage delivery lines 234. Simultaneously with the charging of capacitor 144, the firing signal produced by distributor 138 is delivered by one of the output lines 166 which have been energized and corresponds to the cylinder to be fired, to the trigger of SCR 212. SCR 212 then functions to activate the TRIAC 216 which is operative to couple the ground portion 224 associated with the cylinder about to be fired to ground potential through line 244, thereby permitting the storage capacitor 144 to release energy stored therein through the high voltage line 234 of the cylinder about to be fired. Energy delivered through line 234 is delivered to the capacitive portion 236 of the initiating device 226. When the capacitive portion of 236 of the initiating device 226 is charged to a prescribed level, which charging is completed within approximately 1.5 microseconds, electrical breakdown occurs in the gap 242 resulting in the discharge of the capacitive portion 236 which fires the device 226 by producing a plasma jet that initiates fuel within the cylinder to be fired.

From the foregoing, it is apparent that the initiating device and initiation system of the present invention not only provide for the reliable accomplishment of the object of the invention but do so in a particularly simple yet highly effective manner. It is to be understood that the initiating device of the present invention may be employed in numerous applications for initiating the combustion of various types of fuels, including nuclear fuels. Those skilled in the art may make various modifications or additions to the preferred embodiment chosen to illustrate the invention without departing from the gist and essence of the present contribution to the art. Accordingly, it is to be understood that the protection sought and to be afforded hereby should be deemed to extend to the subject matter claimed and all equivalents thereof fairly within the scope of the invention.

What is claimed is:

1. A device for generating a high energy plasma jet for initiating combustion of fuel, comprising:

a first electrode including a rod shaped member and a tip on one extremity of said rod shaped member; [and]

a second electrode electrically insulated from said first electrode and including an annular portion circumscribing the longitudinal axis of said rod shaped member, said tip being substantially spaced along said longitudinal axis from said annular portion of said second electrode, said tip and said annular portion defining an annular space therebetween across which electrical current may flow to produce an annularly shaped electrical discharge for initiating combustion of said fuel, the longitudinal spacing between said tip and said annular [position] *portion* being sufficient to allow said discharge to generate [a generally cylindrical] *an* electromagnetic field [surrounding said discharge and sufficient in strength to temporarily radially confine] *for urging* said discharge *radially outward from said longitudinal axis; and* means continuous with said first and second electrodes for temporarily storing a quantity of electrical energy therein sufficient to produce said electrical discharge, said device having an inherent inductance sufficiently low to result in the discharge of the stored quantity of electrical energy across said annular space within 60 nanoseconds .

2. The device of claim 1, wherein said first and second electrodes are disposed concentric with respect to said longitudinal axis of said rod shaped member.

3. The device of claim 2, wherein said tip includes a conically shaped outer surface, the outer periphery of said surface being spaced essentially equidistant from said longitudinal axis of said rod member.

4. The device of claim 3, wherein said conically shaped surface forms an angle with respect to a plane extending normal to said longitudinal axis of said rod shaped member, said angle being in the range of between 15 and 90 degrees.

5. The device of claim 3, wherein said tip includes an annularly shaped, flat face contiguous with said conically shaped surface and adjacent the outer periphery of said tip, said annularly shaped flat face forming an angle with respect to said longitudinal axis of said rod shaped member between 0 and 45 degrees.

6. The device of claim 2, wherein said tip includes a hemispherically shaped outer surface.

7. The device of claim 2 wherein said annularly shaped portion of said second electrode includes a first annularly shaped, essentially flat section circumscribing said rod shaped member and immediately adjacent the latter, and a second annularly shaped, essentially flat section circumscribing said first section, said first and second flat sections forming an angle with respect to each other in the range of 0 to 45 degrees.

8. The device of claim 2, wherein said rod shaped member includes a bore extending longitudinally therethrough.

9. The device of claim 2, wherein said annularly shaped portion of said second electrode forms a disk shaped surface circumscribing the circumferential side walls of said rod shaped member.

10. The device of claim 2, wherein said first electrode further includes a tip on one extremity of said rod shaped member, said tip including an annular flange extending radially outward beyond the circumferential side walls of said rod shaped member, and an outer, elongate tip portion longitudinally aligned with said rod shaped member contiguous with said flange.

11. The device of claim 2, wherein said annular portion of said second electrode is disposed adjacent one extremity of said first electrode, said rod shaped member including a cylindrically shaped intermediate section and an annularly shaped flange on [the opposite], *said one* extremity thereof, the diameter of said flange being greater than the diameter of said intermediate section of said rod.

12. The device of claim 11, wherein said [opposite] *one* extremity of said rod shaped member terminats in a conically shaped surface.

[13. The device of claim 2, including means formed integral with said first and second electrodes for temporarily storing a quantity of electrical energy therein sufficient to produce a high energy plasma jet for initiating combustion of said fuel.]

14. The device of claim [13] *1*, wherein said storing means comprises a capacitor having a pair of spaced-apart, electrical storage plates, one of said plates being contiguous to and coupled with said one electrode, the other of said pair of plates being contiguous to and coupled with said second electrode.

15. The device of claim 14 wherein said pair of electrical storage plates have a dielectric material interposed therebetween, said dielectric material being selected from the group consisting of ceramic, water, oil, glycerene, or isopropyl alcohol.

16. The device of claim 15, wherein said rod shaped member is disposed between said tip and said pair of capacitor plates, and each of said capacitor plates of said pair thereof are of generally star shaped cross section.

17. The device of claim 14, wherein said one capacitor plate of said pair thereof is connected to the opposite extremity of said rod shaped member.

18. The device of claim 1, including a layer of electrically insulative material surrounding the cylindrical sidewalls of said rod [shape] *shaped* member and interposed between said annular portion of said second electrode and said rod member.

19. The device of claim 18, wherein said tip is essentially circular in cross section, the circular periphery of said tip extending radially outward beyond the cylindrical sidewalls of intermediate sections of said rod member, whereby the diameter of said tip exceeds the diameter of said intermediate sections of said rod member.

20. The device of claim 19, wherein the outside diameter of said layer of insulative material is less in magnitude than the diameter of said tip.

21. An improved device for initiating combustion of fuel in a combustion chamber using a high energy plasma jet, comprising:

first and second electrodes communicating with said combustion chamber and defining [a] *an* annular discharge gap therebetween across which *a preselected quantity of* electrical energy may be transferred, *said preselected quantity of electrical energy being sufficient in magnitude to produce a high energy plasma jet resulting in the initiation of combustion of said fuel,* said first and second electrodes being configured to produce [a generally cylindrical] *a current flow which creates an* electromagnetic field for [radially confining the transfer of electrical energy between said electrodes during said transfer;] *urging the transfer of electrical energy between said electrodes radially outward: and,* means contiguous with said first and second electrodes and immediately adjacent said combustion chamber for temporarily storing [a] *said preselected* quantity of electrical energy therein [sufficient in magnitude to create said high energy plasma jet], said storing means being adapted for electrically coupling with a source of electrical power and electrically connected with each of said first and second electrodes, *said device having an inherent inductance sufficiently low to result in the discharge of said preselected quantity across said discharge gap within 60 nanoseconds.*

22. The device of claim 21 wherein:

said first and second electrodes are concentrically disposed with respect to each other about a longitudinal axis, said second electrode being annular in shape and circumscribing portions of said first electrode, said first electrode being elongate and including a tip portion on one end thereof, said tip portion being spaced from said second electrode along said longitudinal axis, said discharge gap being defined by an annular space surrounding said first electrode between said tip portion and said second electrode.

23. The device of claim 22, wherein said tip portion is essentially circular in cross section and the periphery of said tip portion extends radially outward from said longitudinal axis beyond the longitudinal sidewalls of said first electrode.

24. The device of claim 23, wherein said second electrode forms an annular cavity surrounding essentially the entire length of said first electrode.

25. The device of claim 24, wherein said annular cavity is dish shaped.

26. The device of claim 22, wherein said second electrode extends radially outward from said longitudinal axis, the interior perimeter of said second electrode being radially spaced from said first electrode.

27. The device of claim 22, including a layer of electrical insulative material surrounding at least parts of said first electrode including said portions thereof and extending from said tip portion toward the other end of said first electrode.

28. The device of claim 21, wherein said first electrode is essentially cylindrical in shape.

29. The device of claim 28, wherein said *first* electrode includes a bore extending longitudinally therethrough.

30. The device of claim 21 wherein said storing means comprises a capacitor including a pair of spaced apart electrical energy storage plates respectively coupled with said first and second electrodes.

31. The device of claim 30, wherein each of said storage plates is essentially star shaped in cross-section.

32. The device of claim 30, wherein said pair of storage plates are each symmetrically disposed about said longitudinal axis.

33. The device of claim 32, wherein said first electrode includes a tip portion on one end thereof distal from said second electrode, said tip portion being generally conical in shape.

34. The device of claim 32, wherein said pair of storage plates are respectively formed integral with said first and second electrodes.

35. A system for sequentially initiating combustion of a plurality of predefined quantities of fuel, comprising:

high voltage generating means adapted to be operably coupled with a source of electrical energy for producing a high electrical voltage;

electrical energy storage means operably coupled with said high voltage generating means for storing a predetermined quantity electrical energy;

a plurality of combustion initiation devices respectively associated with said plurality of said predefined quantities of fuel and spaced distal from said energy storage means, each of said devices including a capacitive portion for storing said predetermined quantity of electrical energy therein and an electrode portion formed integral with said capacitive portion, each said devices being operable to *discharge said predetermined quantity of electrical energy through said electrode portion within approximately 60 nanoseconds, said predetermined quantity of electrical energy being sufficient in magnitude to* produce a high energy plasma jet for initiating combustion of the corresponding quantity of fuel, the electrode portion of each of said devices comprising a first electrode including a rod shaped member having a tip on one end thereof and a second electrode electrically insulated from said first electrode and including an annular portion circumscribing the longitudinal axis of said rod shaped member, said tip being substantially spaced from said annular portion, said tip and said annular portion defining an annular space therebetween across which electrical current may be transferred to produce an [annularly shaped] electrical discharge, the longitudinal spacing between said tip and said annular portion being sufficient to allow said discharge to generate [a generally cylindrical] *an electrical current flow producing an* electromagnetic field [enveloping said discharge, said field being] sufficient in strength [to temporarily radially restrain said discharge whereby to increase the energy density of said discharge] *for moving said discharge, said predetermined quantity of electrical energy being sufficient to produce said magnetic field*; and timing control means operably coupled with said electrical energy storage means and with each of said initiation devices for selectively coupling said electrical energy storage means with said initiation devices in a predetermined timed [sequency] *sequence* whereby to sequentially deliver said predetermined quantity of electrical energy from said storage means to individual ones of said capacitive portions of said initiation devices.

36. The system of claim 35, wherein:

said second electrode is disposed concentric with respect to said first electrode about said longitudinal axis, and said first electrode includes a layer of electrically insulative material covering said rod shaped member and extending between said tip and said annular portion of said second electrode.

37. The system of claim 36, wherein said rod shaped member is essentially circular in cross section, the diameter of said tip being greater in magnitude than the diameter of intermediate sections of said rod shaped member between said tip and said annular portion of said second electrode.

38. The system of claim 37, wherein said tip is generally conical in shape.

39. The system of claim 36, wherein said annular portion of said second electrode extends radially outward from said longitudinal axis, the inner periphery of said annular portion being spaced from the longitudinal sidewalls of said rod shaped member.

40. The system of claim 36 wherein said insulative material is selected from the group consisting of glass or ceramic.

41. The system of claim 35, wherein said capacitive portion of each of said devices comprises a pair of electrically conductive, spaced apart plates defining a capacitor and respectively contiguous with said first and second electrodes.

42. The system of claim 41, wherein each of said plates is symmetrically disposed about said longitudinal axis, said plates being respectively electrically connected to said annular portion of said second electrode and to the opposite extremity of said rod shaped member.

43. The system of claim 41, including a layer of dielectric substance interposed between said plates.

44. The system of claim 43, wherein said dielectric substance is one selected from the group consisting of water, oil, glycerine, isopropyl alcohol or ethylene glycol.

45. The system of claim 41, wherein each of said plates comprises a plurality of sections, each of said sections extending essentially radially outward from said longitudinal axis.

46. The system of claim 35, wherein said high voltage generation means is capable of producing an output of at least approximately 15,000 volts.

47. The system of claim 35, where said high voltage generating means comprises a pulse type voltage generator.

48. The system of claim 35, wherein said high voltage generating means includes an output for delivering high voltage electrical energy thereto, said storage means being electrically coupled to said output of said generating means, said timing control means comprising:

distribution circuit means coupled with each of said initiation devices and with said storage means for selectively distributing electrical energy from said storage means to the corresponding one of said initiation devices.

49. The system of claim 48, wherein distribution circuit means comprises a plurality of electrical circuits respectively associated with said initiation devices, each of said circuits comprising an electronic switch connected between said storage means and the respectively associated initiation device, and an electronic trigger operably coupled with said switch for controlling the latter.

50. The system of claim 49, wherein said timing control means further includes:

first control means operably coupled with said storage means for controlling the discharge of electrical energy stored in said storage means from the latter to said distribution circuit means, and second control means operably coupled with said first control means and with each of said electrical circuits for selectively delivering a control signal simultaneously to a selected one of said electrical circuits and to said first control means.

51. The system of claim 50, wherein said first control means comprises a pair of spaced apart electrical terminals defining a spark gap therebetween and a third electrical terminal coupled with said second control means for inducing electrical breakdown of the medium between said pair of electrical terminals.

52. The system of claim 50, wherein said second control means comprises:

a first electrical terminal adapted to be coupled with a source of electrical power, a plurality of electrical terminals respectively coupled with said electrical circuits, and means for selectively coupling said first electrical terminal with one of said plurality of electrical terminals.

53. The system of claim 50, wherein said timing control means further includes an inductor operably coupled between said first and second control means.

54. The system of claim 35, wherein said high voltage generating means is provided with an input and there is further provided:

a source of electrical power operably coupled with said high voltage generating means.

55. The system of claim 54, wherein said source of electrical energy comprises a battery and means operably coupled with said battery for recharging the latter.

56. The system of claim 35, including a coaxial electrical cable operably coupled between each of said initiation devices and said timing control means, said cable comprising an inner and outer conductor, said inner and outer conductors being operably coupled with the capacitive portion of the corresponding initiation device.

*57. Apparatus for initiating combustion of fuel, comprising:*

*first and second electrodes defining a gap across which a preselected quantity of electrical energy may be discharged, the magnitude of said preselected quantity of electrical energy being sufficient to form a high energy plasma for initiating combustion of said fuel; and*

*capacitor means substantially contiguous with said first and second electrodes for storing said preselected quantity of electrical energy, the inductance of said electrodes and said capacitor means being sufficiently low to allow said preselected quantity of electrical energy to be discharged across said gap within 60 nanoseconds.*

*58. The apparatus of claim 57, wherein said first and second electrodes are symmetric about a common axis.*

*59. The apparatus of claim 58, wherein said discharge gap is annular in shape and is disposed coaxial with and longitudinally along said common axis.*

*60. The apparatus of claim 57, wherein said capacitor means includes first and second storage plates respectively connected to said first and second electrodes.*

*61. The apparatus of claim 57, including means coupled with said capacitor means for charging said capacitor means with said preselected quantity of electrical energy in less than approximately 10 microseconds.*

*62. The apparatus of claim 58, wherein said preselected quantity of electrical energy stored in said capacitor means produces an electrical current through said electrodes sufficient in magnitude to create an inverse pinch electrical discharge across said gap and between said electrodes, and to develop a magnetic pressure for moving said discharge radially outward from said axis, the quantity of said electrical current being given by*

$$I = \sqrt{\frac{8P\pi^2 r^2}{\mu}}$$

*where*

*I is the current,*

*P is the magnetic pressure,*

*r is the radius from the common axis, and*

*μ is the permeability of free space.*

*63. A device for initiating combustion of a gaseous air-fuel mixture in a combustion chamber using a high energy plasma, comprising:*

*first and second electrodes symmetric about a reference axis and defining an electrical discharge gap; and*

*means coupled with said electrodes for storing a preselected quantity of electrical energy sufficient in magnitude to produce an electrical discharge between said electrodes across said gap, said discharge resulting in the initiation of combustion of said gaseous air-fuel mixture,*

*said electrodes and said storing means defining an electrical discharge circuit in said device, said discharge circuit having an inherent inductance and being configured to minimize said inherent inductance and thereby maximize the magnitude of magnetic power generated by the current flowing in said discharge circuit,*

*the inherent inductance of said discharge circuit being sufficiently low to result in the transfer of preselected quantity of electrical energy from said storing means to the electrical discharge in less than approximately 60 nanoseconds.*

*64. The device of claim 63, wherein:*

*said first and second electrodes and said discharge gap are coaxial, said discharge gap being annular in shape and extending longitudinally along said axis,*

*said preselected quantity of electrical power and said magnetic power being sufficient in magnitude to create an inverse pinch electrical discharge between said electrodes across said gap.*

* * * * *